UNITED STATES PATENT OFFICE.

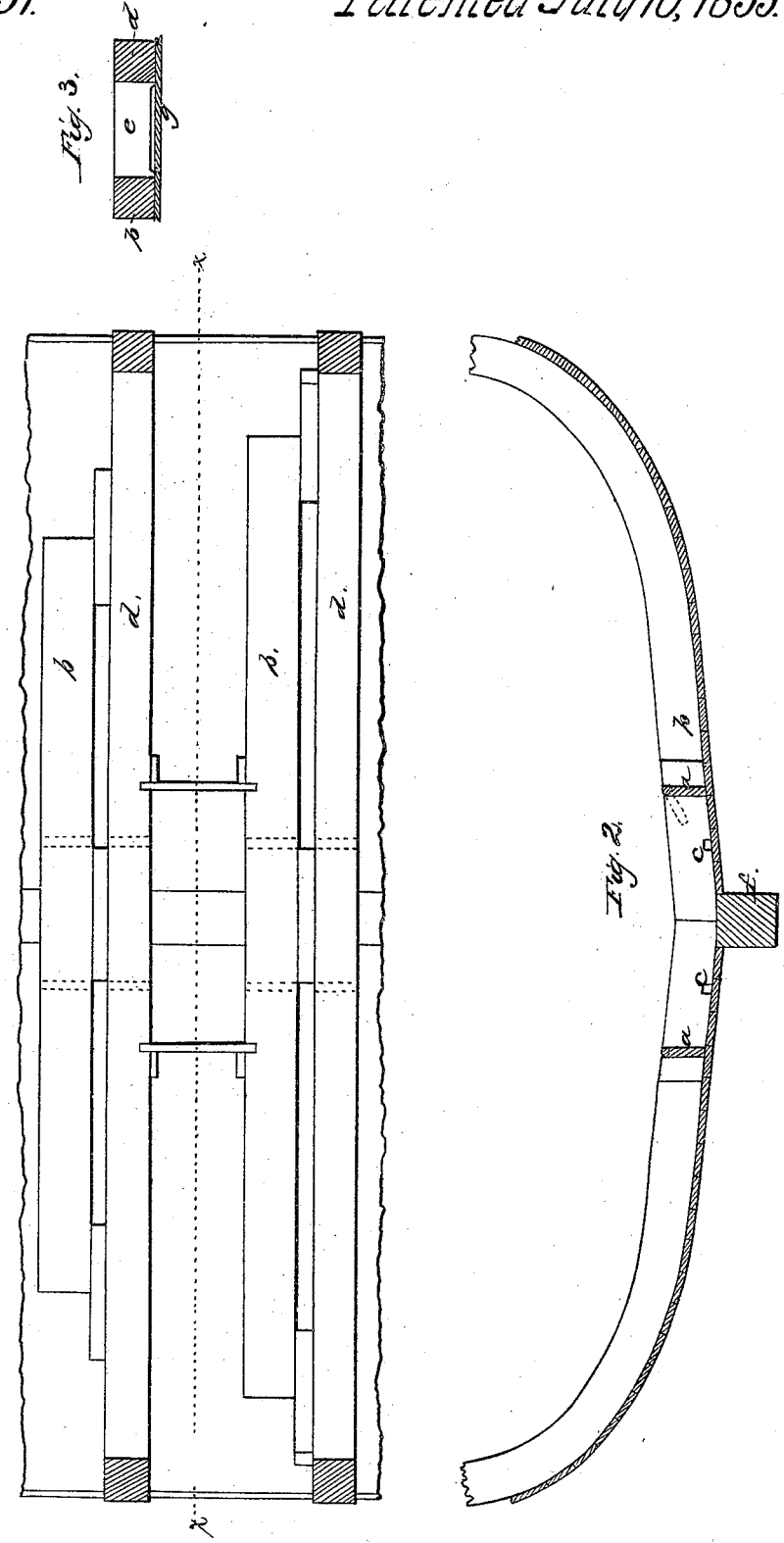
S. Saunders,
Building.
N° 13,231.
Patented July 10, 1855.

STEPHEN SAUNDERS, OF KINGSTON, RHODE ISLAND.

VIBRATING STOP-WATER FOR SHIPS AND OTHER VESSELS.

Specification of Letters Patent No. 13,231, dated July 10, 1855.

*To all whom it may concern:*

Be it known that I, STEPHEN SAUNDERS, of South Kingston, in the county of Washington and State of Rhode Island, have invented and introduced into the hulls of vessels an Improvement in the Shape of Vibrating Stop-Waters; and I do hereby declare that the following is a full and exact description of the arrrangement and uses of the same, reference being had to the accompanying drawings, making a part of this specification, Figure 1 being a horizontal section showing a portion of the bottom of the hull of a vessel; Fig. 2, a vertical section in the line $x$ $x$ of Fig. 1, and Fig. 3 a section of a detached portion of a vessel.

Stationary stop-waters have been placed in the spaces between the timbers of the hulls of vessels, of such a shape as to leave a narrow space between their lower edges and the inner surface of the planks, as represented in Fig. 3, of the accompanying drawings, $e$, being a stop-water, $d$, $b$, the timbers, and $g$, the bottom planking.

The use of the stationary stop-waters is to prevent the water that enters the space between the bottom and the flooring of a vessel, from rushing so rapidly downward, when the vessel is careened as to produce what is technically called "blowing," or the forcing of a portion of the water out through the cracks of the flooring planks. There is however a disadvantage attending the use of the said stationary stop-waters, viz., when a vessel has been for some time running on a wind, or in a careened position, the water will all accumulate below the stop-waters on the lowest side of the vessel; and when it becomes necessary to put the vessel before the wind to pump out, it will require a long time for the water to pass through the narrow openings below the said stationary stop-waters.

The advantages of the vibrating stop-waters, $a$, $a$, are as follows, viz: When a vessel is running on a wind, all the water which the vessel makes above the stop waters which are on the lowest side of the vessel, will be arrested by said stop-waters; and when it becomes necessary to pump out the vessel, and she is brought up before the wind for that purpose, the said stop-waters on the side of the vessel that was depressed, will swing inward and allow the water outside of them to readily flow inward to the pump well.

Another advantage resulting from the use of my vibrating stop-waters, is that when a vessel is rolling, while running before the wind, the water will be prevented from flowing outward from the space above the keel. The said vibrating stop-waters $a$, $a$, are suspended on pivots at their upper angles, and they are so proportioned that when in a vertical position, their lower edges will be in contact with the bottom planking of the vessel.

The usual limbers, or apertures $c$, $c$, (shown in Fig. 1) must be made in the lower sides of the timbers, to allow the water to find its way from the ends of the vessel to the pump wells.

What I claim as my invention and desire to secure by Letters Patent, is—

The improvement produced by the combination of vibrating stop-waters with the hulls of vessels, substantially as herein set forth.

The above specification of my improvement in sailing and other vessels produced by the combination of vibrating water stops with the hulls thereof, signed and witnessed this thirtieth day of April 1855.

STEPHEN SAUNDERS.

Witnesses:
P. H. CARPENTER,
BENJ. HULL.